Aug. 18, 1942.   W. W. STEVENSON   2,293,478
FLUID METER
Filed Sept. 10, 1938   4 Sheets-Sheet 1
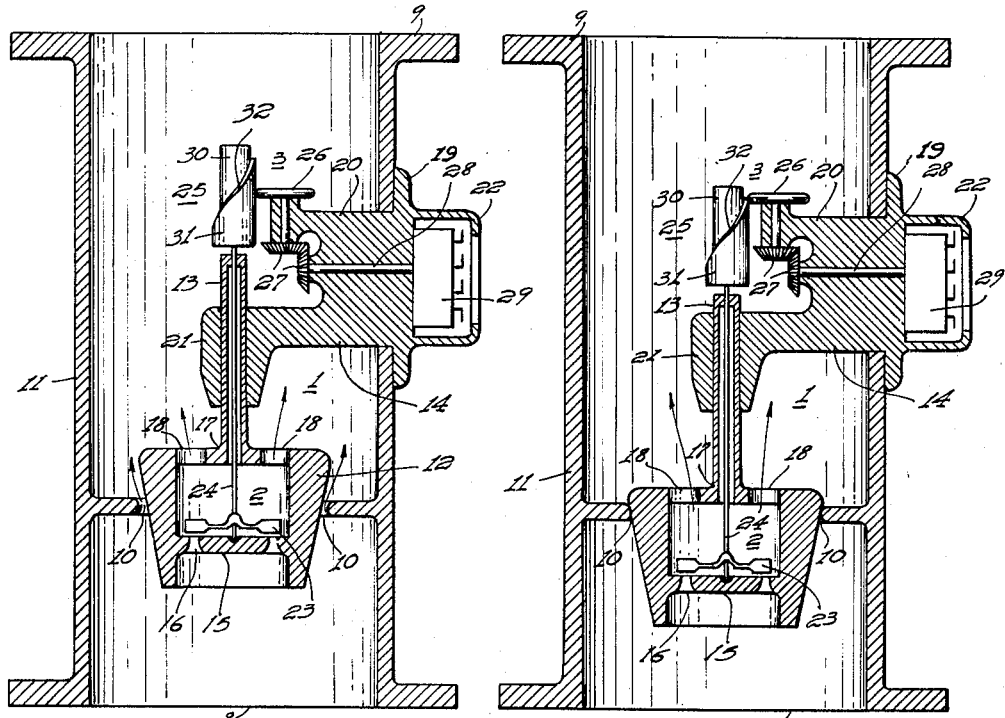
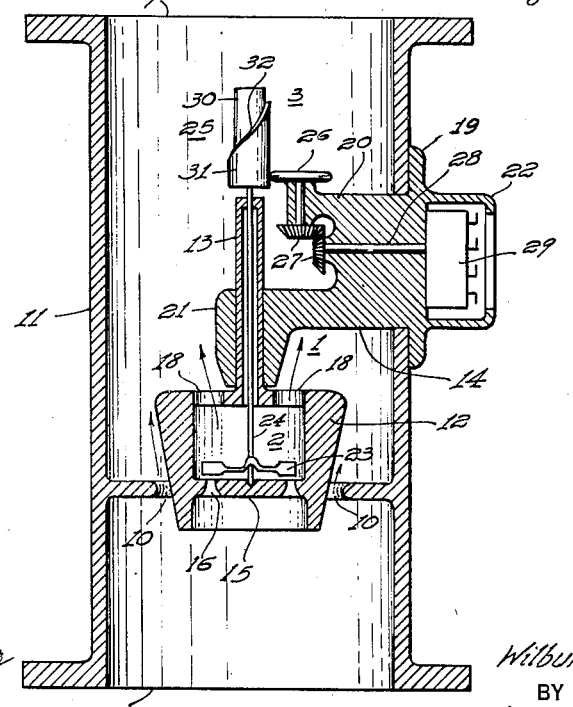
WITNESSES:
INVENTOR
Wilbur W. Stevenson.
BY
William R. Coley
ATTORNEY Aug. 18, 1942.  W. W. STEVENSON  2,293,478
FLUID METER
Filed Sept. 10, 1938  4 Sheets-Sheet 2

INVENTOR
Wilbur W. Stevenson.
BY
William R. Coley
ATTORNEY

WITNESSES:

Aug. 18, 1942.  W. W. STEVENSON  2,293,478

FLUID METER

Filed Sept. 10, 1938  4 Sheets-Sheet 3

WITNESSES:

INVENTOR
Wilbur W. Stevenson.
BY
William R. Coley
ATTORNEY

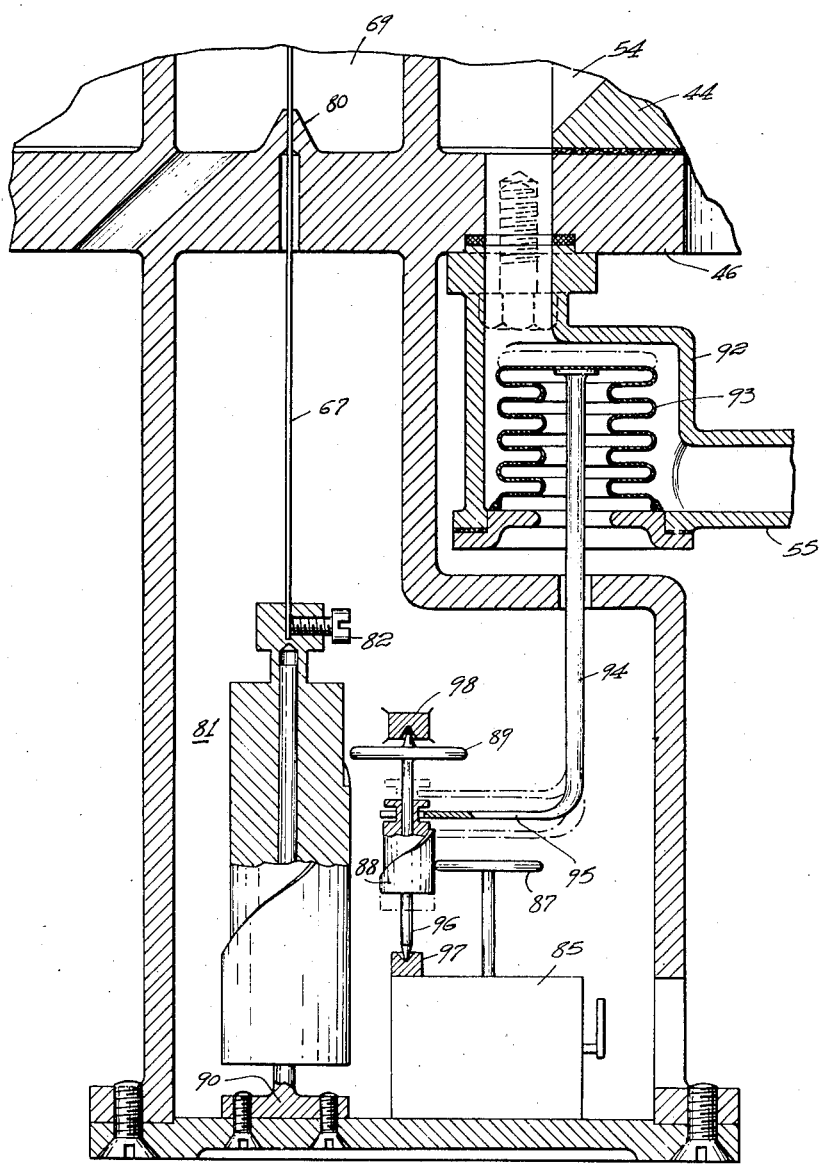

Patented Aug. 18, 1942

2,293,478

UNITED STATES PATENT OFFICE 2,293,478

FLUID METER

Wilbur W. Stevenson, Pittsburgh, Pa.

Application September 10, 1938, Serial No. 229,231

8 Claims. (Cl. 73—203)

My invention relates to fluid meters and has particular reference to meters for accurately measuring the flow of steam or other gas.

One object of my invention is to provide an accurate and very compact wide-range meter having a minimum number of working parts, including only one rotor.

Another object of my invention is to provide a fluid meter comprising a movable weighted valve responsive to and variably restricting the flow through the meter, together with a fixed passageway through which fluid flows in parallel to the flow past the valve, and a single turbine type rotor operated by the fluid flow and driving a rotating cam which is so connected with the movable portion of the valve as to cause the cam to transmit rotary motion to an integrator directly proportional to the rate of fluid flow through the meter.

A further object of my invention is to provide a fluid meter comprising a weighted valve that remains substantially closed at low rates of flow and having a fixed fluid passageway by-passing the valve, together with a turbine type rotor driving an integrator in proportion to the rate of flow while the valve is substantially closed and also while it is wide open, and a rotating cam driven by the rotor for driving the integrator and so alterable in its driving relation therewith as to cause the integrator to register in true proportion to the total rate of fluid flow while the valve is partially open.

Another object of my invention is to provide a flow meter having a variable orifice and a rotor operated by a shunt circuit around the orifice, together with a rotor driven cam having a variable surface contact with a driving wheel for an integrator, the degree of such surface contact varying in accordance with variations in the variable orifice to accomplish accurate metering in three ranges, namely, (1) A low range with said variable orifice closed, (2) A normal range with said variable orifice open intermediate amounts, and (3) An overload range with said variable orifice wide open.

Another object of my invention is to provide a fluid meter having a fluid-passing opening and a plug therefor of such contour as to gradually uncover the opening upon predetermined increased fluid flow, a rotatable turbine wheel and nozzle means therefor being located within the plug.

A further object of my invention is to provide an apparatus of this character in which a cam driven from the rotor is effective to intermittently operate an integrator.

An other object of my invention is to provide a fluid meter comprising a housing having an internal fluid-passing opening, a hollow plug therefor of the type set forth above including a rotor therewithin and an outer casing spaced from the housing to provide a suitable chamber for separation of extraneous material from the fluid being measured.

Still another object of my invention is to provide a device of the character in question in which the plug is readily removable through an aperture in one end of the housing when the covering therefor is removed without requiring disassembly of the housing or of the casing enclosing the same.

Other more specific objects of my invention will become evident from the following detailed description, taken in conjunction with the accompanying drawings wherein:

Figures 1, 2 and 3 are views, partly in elevation but mainly in longitudinal section, of a simple form of fluid meter constructed in accordance with my present invention, the apparatus being shown in various operative positions;

Figs. 5, 6 and 7 are views, partly in elevation but mainly in longitudinal section, of the preferred form of my fluid meter, Fig. 7 being an enlarged view of a portion of the apparatus.

Figure 4:
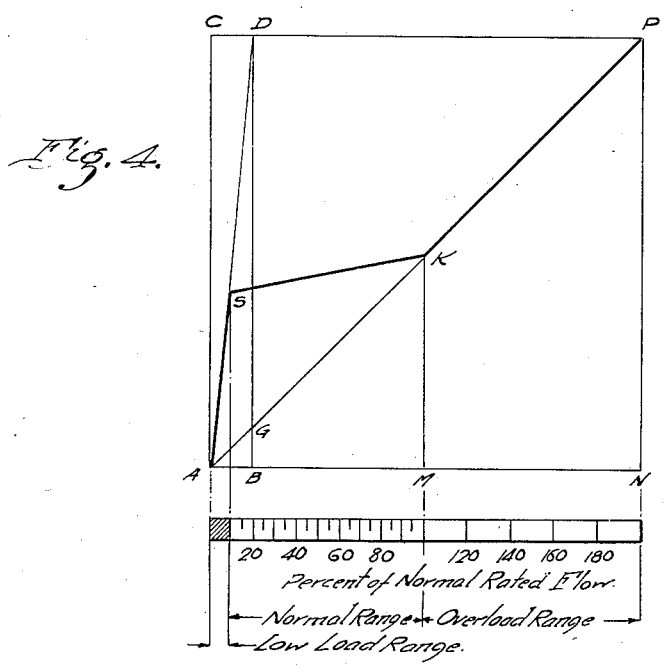
Fig. 4 is a chart indicating the various ranges of operation of my improved apparatus.

My invention comprises a simplified turbine type fluid meter which performs all of the services of the meter described in my Patent No. 2,100,495, issued November 30, 1937, but in so doing makes use of only one rotor instead of two as in that invention, and incorporates several other improvements, both in design and operating performance.

My present meter comprises three essential elements which can be grouped and articulated in many ways. A simple arrangement of these to constitute the meter are shown in Fig. 1, and will be described first in order that its operation may be more easily understood than by immediate reference to the more complicated but preferred form shown in Figs. 5, 6 and 7.

The three elemental parts are:

An assembly 1 including a variable orifice, that is, an orifice having a variable fluid transmitting capacity under conditions of constant differential pressure across the orifice, a turbine type rotor assembly 2, and a cam controlled integrator assembly 3.

The assembly 1 comprises a restricting orifice 10 in meter casing 11, of any suitable construction, with which orifice a downwardly tapering movable plug 12 is associated, a movable plug guide 13 and a bracket 14 therefor being provided. Upstream side or inlet is designated by reference character 8, and downstream side or outlet by reference character 9.

Plug 12 is hollow, having an intermediate horizontal partition 15, which is provided with a series of nozzles 16. The thin top wall 17 has a plurality of outlet ports 18.

The guide 13 comprises a hollow cylinder extending upwardly from the central portion of the upper wall 17 of plug 12. Bracket 14 has a central or body portion 20, flanged over against the meter casing 11, as indicated at 19, or otherwise suitably secured thereto; an arm 21 for slidably receiving the plug guide 13; and a hollow external portion or box 22, for a purpose to be described.

The rotor assembly 2 comprises a turbine type rotor with suitable radial blades 23, and a rotor shaft 24 suitably pivotally mounted on partition 15 and entirely enclosed within plug 12 and guide 13 and connected at its top end to rotating cam 25, to be hereinafter described. Fluid flows through nozzles 16 in partition 15 of plug 12 from the upstream to the downstream side of the variable orifice 10 to drive the rotor, such fluid being discharged upwardly through outlet ports 18 in upper wall 17 of plug 12.

The cam-controlled integrator assembly 3 comprises a cylindrical rotating cam 25 connected to and operated by rotor shaft 24, and a drive wheel 26 and bevel gears 27 for driving shaft 28 of integrator 29, of any suitable type. Cam 25 is shown as having a small-diameter cylindrical portion 30 and a large-diameter cylindrical portion 31, the two portions having the same axis and merging through a helical boundary 32.

Fig. 1 shows a simplified vertical design of the meter with fluid flowing upward as indicated by the arrows, the plug 12 occupying an intermediate operative position.

The orifice plug assembly, comprising plug 12, guide 13, rotor 23, rotor shaft 24 and cam 25 is free to move vertically as a unit within definite limits through the guide bracket 21. The extreme positions of these parts relative to the stationary portions of the meter with which they are associated are illustrated in Figs. 2 and 3. Fig. 2 shows the assembly in its lowest position with the plug 12 resting on the edges of and entirely closing the restricting orifice 10. Fig. 3 shows the highest position, with the body of the plug 12 in contact with the bracket 21.

In Fig. 1 the fluid flow is represented to be sufficiently great to raise the plug 12 to approximately its mid position. Under this condition there are obviously two paths for fluid flow past the plug 12, one through the variable orifice 10 formed by the insertion of the movable plug 12 within the orifice; the other through the fixed nozzles 16 within the plug itself. The jets of fluid caused by the flow through these nozzles impinges on the blades 23 of the rotor, which are set at an angle to the direction of the jets, causing the rotor to revolve. The cam 25 is, in effect, a triangular shaped plate of metal wrapped around a vertical cylinder 30. Being directly connected to the rotor shaft and rotor, this cam is rotated by the latter, and in so doing contacts the drive wheel 26 during a portion or all of each rotation, depending upon the height of the cam, thus driving the integrator 29 by means of intermittent engagements.

We will now consider the operation of the meter at various ratings from no load to maximum load. At no load the variable orifice 10 is closed and the cam 25 is in its lowest position (Fig. 2). Let us assume that a flow of fluid is established at a rate slightly less than that necessary to raise the plug 12. This flow will operate the rotor 23, cam 25 and integrator 29 as previously described. Let us also assume, in order to be specific, that this particular meter is so designed that 8% of its full rated flow can pass in this way without raising or unseating the plug. The operating range between zero and this 8% point will be specified as the "low load range." Throughout this range it will be seen that the meter operates as a simple anemometer inserted in a duct with the counter or integrator connected to the outside of the duct instead of near the rotor. The only difference is that in this case the integrator 29 is driven forward in a step by step motion due to the fact that the larger cam portion 31 contacts the drive wheel 26 during only a portion of each revolution. This does not alter the fact, however, that the cumulative integrator registration is truly proportional to the speed of the rotor, and the rotor itself rotates in true and direct proportion to the rate of fluid flow through the nozzles 16, except for the characteristic inaccuracy at low rates of flow when the differential pressure across these nozzles becomes exceedingly small. Throughout this 8% low range the meter performance is also similar to the conventional form of mercury operated differential type flow meter in that the rate of fluid flow is proportional to the square root of the differential across the meter orifice.

As the rate of flow exceeds 8%, the plug raises, allowing the passage of fluid through the variable orifice 10 in parallel with the flow through the fixed nozzles 16. In order to raise this plug from its seat, a differential pressure (usually of considerable magnitude) must be established between the upstream and downstream side of the variable orifice. This condition causes an increase in the rate of flow through the fixed nozzles 16 throughout this range, and the speed of the rotor is increased in proportion. In other words, the rotor continues to measure the flow through its fixed nozzles regardless of the position of the plug; but since it drives the integrator through the movable cam the increment of contact surface on the cam with driving wheel 26, corresponding to the various raised positions of the cam is so designed and calibrated as to compensate for the increase of flow through the variable orifice, thereby producing a cumulative registration on the integrator proportional to the total flow through the meter. This range of measurement from 8% to 100% of normal full capacity will be known as the "normal operating range."

It will be understood that, with respect to calibrating the meter of my present invention, that is, making the registration on the integrator directly proportional to the quantity of fluid flow, two things can be done, either one or both of which combined will bring the meter into calibration. The first is to change the contour of the cam, as will be readily understood, and the second is to change the contour of the variable orifice plug, or a combination of these two things may be employed. By removing the plug and placing it in a lathe, metal can be removed from its surface in such a way as to vary its contour and thereby change the ratio of the lift of the plug (and the registration on the integrator) to the quantity of fluid flow. This principle is old and has been in actual practice for at least thirty years on American meters.

As the rate of flow increases and becomes just sufficient to hold the plug rigidly in its wide open position, as shown in Fig. 3, the differential pressure begins to increase at a more rapid rate; the square root of this pressure again becoming directly proportional to the quantity flow through the meter. The cam is held stationary in its highest position, and all, or a much larger proportion of its surface contacts the driving wheel during each revolution. Under this condition the operation of the meter again becomes exactly similar to that in the low range, and equivalent to the suggested anemometer operating in a very large duct instead of a small one, and with the driving mechanism of its integrator speeded up in proportion to the effective cross-sectional areas of the two ducts. Under this condition the rate of flow can be increased indefinitely with the registration continuing in true proportion to the flow until some portion of the mechanism fails or until some extraneous forces, such as vibration or chattering, interferes. In order to be specific in further consideration of the meter, we will designate this operating range above 100% of rated capacity as the "overload range," and set a limit on it at 200% of rated capacity, which we will further designate as the "maximum rating."

For a complete understanding of the performance of the meter, the foregoing simple explanation of mechanical movements should be supplemented by a consideration of its operation shown graphically, as in Fig. 4. In this diagram horizontal dimensions represent rates of flow, and vertical dimensions represent relative operating speeds of the rotor and also of the integrator.

Referring first to the rectangle ABCD, the straight line ASD represents the relative operating speed of the meter rotor for all rates of flow, under an abnormal operating condition in which the variable orifice plug is blocked or held closed as in Fig. 2. Under this condition, the only fluid that can pass through the meter is that passing the rotor nozzles 16, and the meter reaches its extreme maximum speed at D (dependent upon design) when only 20% of normal full rated flow is passing, as indicated by the abscissae AB. Since the cam is held in a definite vertical position during this form of operation, the integrator will be driven in direct proportion to the rotor speed. The ratio of line lengths BG to BD indicates the proportion of cam circumference in contact with the integrator drive wheel during this form of operation.

Considering now the rectangle ANPC, the straight line AGKP shows the relative operating speed of the meter rotor when the meter plug is blocked or held stationary in its wide-open position, as in Fig. 3. Under this condition, the cam is also immovable vertically, and a maximum proportion of its surface contacts the integrator drive wheel.

In actual practice the accuracy of the meter would be unreliable at low ratings if used in the form described. If the meter were used in either of the abnormal conditions set forth, the cam would serve no useful purpose, and the meter rotor might be connected (through suitable reduction gearing, if necessary) direct with the integrator. These abnormal conditions, however, serve to illustrate the changeover from fixed orifice to variable orifice control and vice versa.

This brings us to the normal operation of the meter when the plug 12 is permitted to float freely on the stream of fluid passing the orifice, throughout the normal range. Under this condition, the heavy full line ASKP represents the relative speed of the rotor, and the straight line AGKP, the relative speed of the integrator for normal operation.

From A to S the plug is closed and the rotor is operating as a small fixed orifice (nozzle) meter.

From S to K the plug is open to constitute a variable orifice with the rotor driving the integrator under cam control.

From K to P the plug is wide open, with the rotor operating as a large fixed orifice meter.

This analysis shows that this meter has the advantage of a metering range ten times the length of a simple fixed orifice turbine type meter; the maximum capacity line AN being ten times the length of the maximum capacity line AB for the simple meter. It is not to be understood, however, that the range of this meter is fixed at ten times that of a simple meter. If by virtue of accurate workmanship the rotor be made to operate with one-half the rotor current through the nozzles 16, then the meter range will be 20 to 1; and if the cross-section of the variable orifice be increased by application to larger and still larger pipe lines, the ratio may be 50 to 1 or 100 to 1, or even greater.

It will be observed that Fig. 1 has necessarily been presented in an elementary way, and thereby excludes many important corollary features of my invention. To have included them in the preliminary drawings would not only have caused unnecessary complications, but might have distracted attention from the more important to the less important features. I am therefore, presenting in Figs. 5, 6 and 7 cross-sectional and elevational views of my meter in its preferred form.

This preferred form comprises, in general, an assembly 43 including a variable orifice 57 with cooperating plug 58, housing 50 therefor and meter casing 40; a turbine rotor assembly, including blades 62 and shafts 64 and 67 and intermediate gear box 66; and a cam-controlled integrator 85, having a density-controlled compensating apparatus including a bellows 93.

Figures 5, 6:
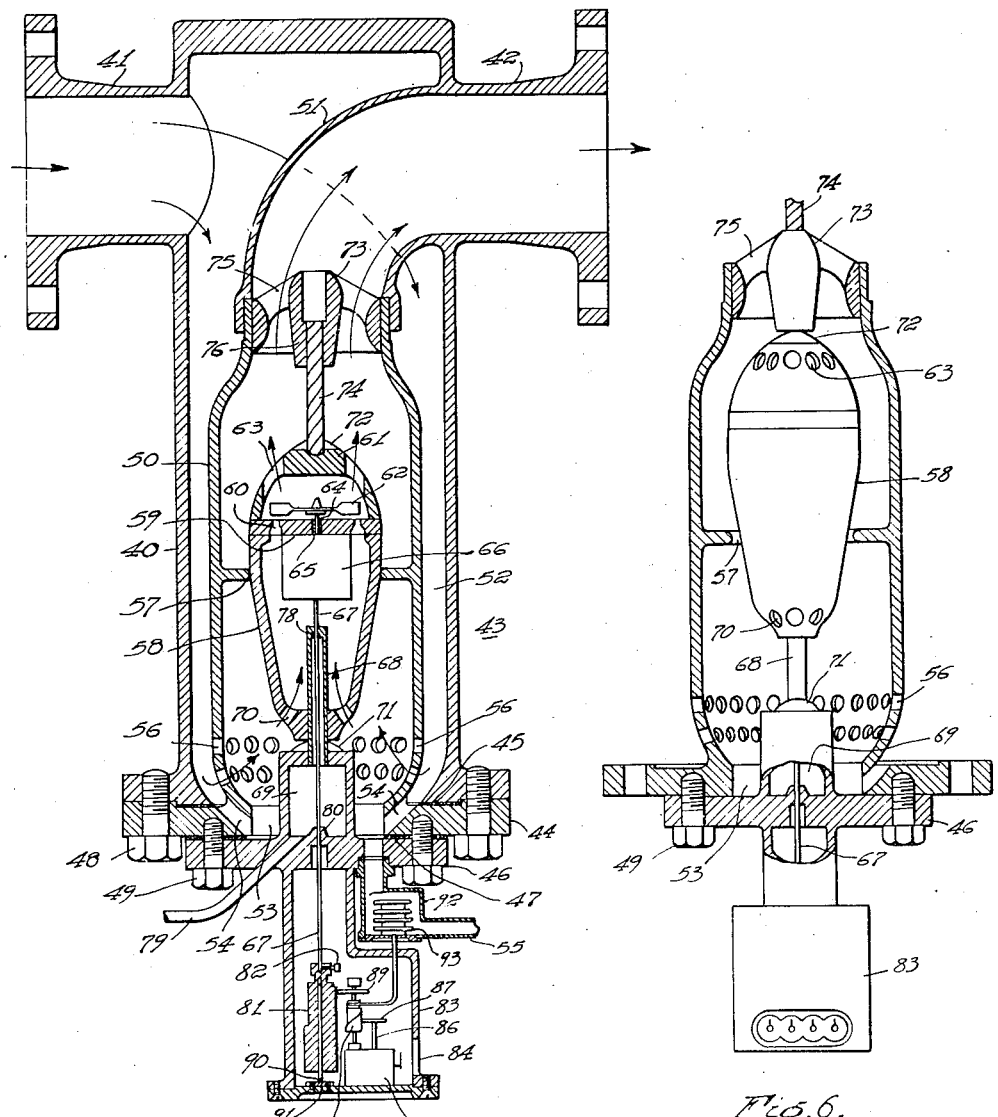

Referring in detail to Figs. 5, 6 and 7, I show a one-piece meter casing 40, including a straight inlet 41, a curved outlet 42, and a lower portion 43 which in connection with other parts forms a separator. A large bottom flange 44 is provided on separator 43, with a gasket 45, and a small bottom flange 46, with a gasket 47, suitable bolts 48 and 49 serving to secure the large flange 44 to separator 43 and small flange 46 to large flange 44, respectively. A variable orifice housing 50 of elongated bulbous shape, is rigidly connected to main bottom flange 44, integrally or otherwise, and slip-fitted at its upper end into meter casing elbow 51, which forms a part of outlet 42. An annular separating chamber 52 is thus provided between the vertical walls of separator 43 and the walls of housing 50.

A collecting chamber 53 for extraneous material is formed by a central opening in large flange 44, drain holes 54 being provided for draining extraneous material from the separating chamber 52 into the collecting chamber 53. A pipe connection 55 leads from collecting chamber 53 to a trap (not shown) for draining away extraneous material.

Inlet ports 56 are provided near the bottom of housing 50 for admitting fluid to the variable orifice chamber within the housing, the orifice 57 being located at substantially the mid-point of the housing, internally thereof. A movable portion or plug 58 is located within the variable orifice 57, and is generally pear-shaped. A rotor nozzle plate 59 is provided within plug 58 and has suitable nozzles 60 therein. The upper portion of plug 58 constitutes a rotor cover 61, the rotor 62 being suitably mounted on suitable supports (not shown) within gear box 66. Outlet ports 63 are provided in the upper surface of cover 61.

A rotor shaft 64 extends downwardly through bearing 65 in plate 59 and then into a box or casing 66 containing suitable speed-reducing gears connecting the driving shaft 64 with the slower speed driven shaft 67, which is housed within hollow guide 68 for plug 58. Guide 68 has a close-fitting aperture 78 at its upper end, and extends through the bottom of plug 58 to the top wall of an atmospheric pressure leak-off chamber 69, integrally or otherwise secured to small bottom flange 46 within opening 53 in large flange 44. An untrapped drain 79 communicates with chamber 69.

Inlet ports 70 are provided near bottom of plug 58 for admitting fluid to the rotor nozzles by way of the interior of the plug. A spring washer 71 is located between plug 58 and leak-off chamber 69 and is used for absorbing the shock when plug 16 falls rapidly. An upper spring washer 72 is located on top of rotor cover 61 and is used for absorbing the shock when plug 16 is thrust rapidly upward against hollow guide structure or spider 73, which is fitted within upper end of housing 50 and has a spiral nut 76 to receive spiral screw 74 rigidly attached to rotor cover 61. The upper guide and spider piece 73 has suitable outlet openings 75 leading from the interior of plug 58 to outlet 42.

Driven shaft 67, after passing through leak-off chamber 69, passes through aperture or bearing 80 and is secured to double-diameter cam 81 by set screw 82. An integrator casing 83 is located below separator 43, having a window 84 therein and housing a suitable integrator 85. A drive shaft 86 is fitted with a drive wheel 87, which engages a double-diameter compensating cam 88, which, through a compensating cam drive wheel 89, is driven from cam 81, which, in turn, is connected to and suspended by cam driving shaft 67. A bottom guide post 90 is mounted on bottom wall 91 of integrator casing 83 to permit the cam to rotate.

An enclosure or enlarged portion 92 of pipe connection 55 is provided for housing the actuating element 93 of a fluid-quality compensating device, which is secured at its bottom to enclosure 92. A connecting rod 94 extends from actuating element 93 to compensating cam 88, being provided with a right-angle extension 95, which is suitably loosely secured to the compensating cam.

Cam 88 is mounted on a shaft 96, having a bottom bearing and support 97 attached to integrator 85. An upper bearing and guide 98 for shaft 96 may be attached to integrator in any suitable manner, as by a bracket support (not shown).

Fluid enters and passes through the meter as indicated by the arrows in Fig. 5. In making the 180% turn through the inlet ports 56, extraneous heavy material in the fluid stream is separated out by a combination of centrifugal force and gravity, and removed through the bottom drain connection 55. After passing into the variable orifice housing 50, fluid flows upward around and through the plug 58 and in so doing operates the rotor 62, lifts the plug 58, and drives the integrator 85 through the cam contact 81 in a manner identical with that discussed in connection with Figs. 1, 2 and 3.

All interior parts of the meter, including plug 58 and housing 50, as shown in Fig. 6, are so constructed as to be easily removable as a unit, by disconnecting the large bottom flange 44, and withdrawing these parts vertically downward and out of the casing.

This is a highly important feature in the case of large size meters, since it is unnecessary to remove the heavy meter bodies from the pipe lines for such routine work as testing, repairs, etc. When these inner parts are so removed and inserted in another similar, but not necessarily identical, meter body, the meter can be calibrated and tested with the assurance that it will register in identically the same manner as when operating in its own particular casing. In addition to this convenience, the active internal parts, including plug 58, can be removed at the bottom in the same way by disconnecting the small bottom flange 46.

In practical operation, fluid flow is often so variable and fluctuating that some means of damping out vibrations of the parts forming the variable orifice is necessary. Dash pots have been used extensively for this purpose, but one of the important minor improvements incorporated in my meter is the use of a simple spiral screw 74 and nut 73 as illustrated in Fig. 5, which perform this function mechanically, and occupy far less space and possess many other advantages over a dash pot. The spring washers 71 and 72 cushion the stopping of the plug at the upper and lower limits of its travel on this spiral. The limited forward and backward rotation of the plug as it moves up and down on the spiral screw has no detrimental effect on the operation of the meter. The excellence and effectiveness of this "inertia" form of dash pot has been proven in actual operation on meters of this design.

Although my meter could actually be constructed as shown in Figs. 1, 2 and 3, with the rotor directly connected by means of a single shaft to the cam, practical considerations of rotor size, speed, etc. would generally require a set of reduction gearing to be inserted as shown by gear box 66 in the preferred form, Fig. 5, in order that the cam will rotate at a much slower speed. However, the use or exclusion of this feature is inconsequential so far as the basic elements of my invention are concerned.

Under some conditions of operation it may be desirable with this form of meter to allow the cam-driving shaft 67 such freedom through the pressure-tight aperture 78 as to allow a very small quantity of fluid to leak past. The lower aperture 80 and the atmospheric drain pipe 79 are provided to cover this contingency.

The plug is shown in its highest position in Fig. 6 in contrast to its lowest position in Fig. 5.

The operating significance of the parts in these extreme positions is clearly set forth in the discussion of other forms of the meter as shown in Figs. 1 to 4, inclusive.

It is a well-known fact that a fluid meter of this general type will not register correctly unless all qualities of fluid which affect its density remain constant. Since it is not always convenient, when measuring compressible fluids, to maintain a constant density at the meter, it is desirable to provide an attachment which will so compensate for changes in density that the meter will register in true proportion to the weight or volume of fluid flow. A device for accomplishing this purpose is illustrated (enlarged) in Fig 7.

In general, this mechanism compensates for quality by means of auxiliary rotating cylindrical cam 88 inserted in the integrator driving mechanism and actuated by element 93, mechanically sensitive to fluid quality, located within the fluid space of the meter.

The position of this device on the meter is shown as being immediately above the integrator casing 83 in Figs. 5 and 7, and the device is illustrated in detailed cross-section in Fig. 7. The actuating element 93, of a well-known bellows type, which is rigidly attached to its enclosure at the bottom, as shown in Fig. 7, is also rigidly attached to the connecting rod 94. This element is in direct contact with the fluid being measured, and may be constructed in various forms in order to be most responsive to particular fluid qualities. In this case it is in the form of a bellows which is readily actuated by pressure. The connecting rod 94 engages the compensating cam 88 by means of a groove and collar attachment near the top of the latter.

The compensating cam drum is also slidably mounted on the square (for instance) shaft 96 by means of a square (for instance) hole through its center. It is, therefore, rotated by the shaft 96, and positioned while it rotates, by means of the actuating element 93, through the rod 94 which supports the cam at its lower extremity.

The extreme upper and lower positions of this cam are illustrated in Fig. 7 by dotted lines of all moving parts involved in its vertical motion. The cam is rotated by the wheel 87 and is so constructed and calibrated as to drive the integrator at rates proportional to the pressure, or temperature, for which it is intended to compensate.

It will be noted that this device compensates throughout the entire three operating ranges of the meter, and is entirely independent of all mechanical movements involved in the operation of the variable orifice.

While I have disclosed various modifications of my new fluid meter, I do not wish to be restricted to the specific structure or arrangement of parts disclosed herein, as various further modifications thereof may be effected without departing from the spirit and scope of my invention. I desire, therefore, that only such limitations shall be imposed thereon as are indicated in the appended claims.

I claim as my invention:

1. A fluid meter comprising a casing having a fluid-passing opening, a plug therefor of such contour as to gradually uncover said opening upon predetermined increased fluid flow, and a rotatable turbine wheel on which fluid other than flowing through said opening is made to impinge, said turbine wheel being operatively mounted within said plug, and said plug having a passageway through which fluid may flow to operate said turbine wheel.

2. A fluid meter comprising a casing having a fluid-passing opening, a substantially vertically operable plug therefor of such contour as to gradually uncover said opening upon predetermined increased fluid flow, a rotatable turbine wheel on which fluid other than that passing through said opening is made to impinge, said turbine wheel being operatively mounted within said plug, and said plug having a passageway through which fluid may flow to operate said turbine wheel and being substantially vertically movable within predetermined limits.

3. A fluid meter comprising a casing having a fluid-passing opening, a plug therefor of such contour as to gradually uncover said opening upon predetermined increased fluid flow, a rotatable turbine wheel on which fluid other than that flowing through said opening is made to impinge, said turbine wheel being operatively mounted within said plug, and said plug having a passageway through which fluid may flow to operate said turbine wheel, an integrator, and a plural-diameter cam driven from said turbine wheel and movable with said plug for operating said integrator for periods the durations of which are dependent upon the position of said plug.

4. A fluid meter comprising a housing having fluid inlet means, an internal fluid-passing opening and fluid-outlet means, a plug therefor of such contour as to gradually uncover said opening upon predetermined increased fluid flow, a rotatable turbine wheel on which fluid other than that passing through said opening is made to impinge, said plug having a passageway through which fluid may flow to operate said turbine wheel, and an outer casing enclosing said housing and having an inlet and an outlet on opposite sides of said casing and respectively communicating with said fluid-inlet means and with said fluid-outlet means, one end of said housing having an aperture and a covering therefor, said plug being removable through said aperture when said covering is removed without requiring disassembly of said housing or of said casing.

5. A fluid meter comprising a casing having a fluid-passing opening, a hollow plug therefor having a portion substantially conical in shape to gradually uncover said opening upon predetermined increased fluid flow, said plug having a solid outer surface except for fluid-inlet and fluid-outlet means, and a rotatable turbine wheel on which fluid from said inlet means is made to impinge, said turbine wheel being operatively mounted within said hollow plug.

6. A fluid meter comprising a casing having a fluid-passing opening, a hollow plug therefor disposed inside said casing and having a portion substantially conical in shape to gradually uncover said opening upon predetermined increased fluid flow, said plug having a solid outer surface except for fluid-inlet and fluid-outlet means near opposite ends thereof, said casing having inlet means disposed below said plug, and a rotatable turbine wheel on which fluid from said inlet means is made to impinge, said turbine wheel being operatively mounted within said hollow plug.

7. A fluid meter comprising a casing having a fixed orifice, a movable plug within said fixed orifice, said plug having a passageway and a rotor mounted therein, and operated as an anemometer type meter by the flow of fluid through said passageway of said plug at all rates of flow up to a rate sufficient to raise and float said plug, comprising thereby a low flow metering range meter, an integrator, a cylindrical cam attached to and rotated by said rotor, said cam variably engaging and driving said integrator during all rates of flow in which said plug, rotor and cam are floated at variable heights, by virtue of the variable contour of said plug within said fixed orifice, comprising thereby an intermediate metering range meter in which range the meter is subject to calibration both by the contour of the plug and the contour of the cam, a third and highest flow-rate metering range being provided by means of the above described structure in combination with a detent to limit the upward movement of movable parts, the rotor again revolving as a simple anemometer-type meter in a fixed upper-limit position.

8. A wide-range fluid meter as described herein comprising a housing, a hollow movable plug therein, an anemometer-type rotor fixed within said hollow movable plug, said plug having a conical exterior and being mounted within a fixed orifice, and movable vertically by fluid flow within that orifice between fixed limits to produce a variable area orifice, an integrator, a cylindrical cam mounted on the shaft of said rotor and movable vertically with said rotor and plug, and driving said integrator, said plug having therewithin fixed apertures to direct the flow of fluid upon and rotate said rotor in direct proportion to the velocity of fluid through said apertures, all of which produce operation of said rotor at its lowest fixed position to measure a relatively small quantity of fluid passing through said fixed apertures, the operation of said rotor in an intermediate range of movement by fluid flow through the variable orifice to measure fluid in such range under the calibration control of either the cam or contour of plug, or both of them, and the continued operation of the rotor at highest rates of flow as an anemometer in a large fixed-area passageway.

WILBUR W. STEVENSON.